United States Patent [19]

Augustine

[11] 4,414,869

[45] Nov. 15, 1983

[54] COUNTERBORE BORING AND REFACING TOOL

[76] Inventor: Paul M. Augustine, 418 E. First Ave., North Vancouver, British Columbia, Canada, V7L 1B7

[21] Appl. No.: 253,599

[22] Filed: Apr. 13, 1981

[51] Int. Cl.$^3$ .............................................. B23B 3/24
[52] U.S. Cl. ................................... 82/4 R; 408/111; 408/709
[58] Field of Search ..................... 82/4 R, 4 C, 1.2; 408/80, 81, 111, 709

[56] References Cited

U.S. PATENT DOCUMENTS

| | | | |
|---|---|---|---|
| 1,470,641 | 10/1923 | Pochila | 82/4 R |
| 1,837,390 | 12/1931 | Albertson | 408/82 |
| 1,882,689 | 10/1932 | Albertson | 408/82 |
| 1,980,288 | 11/1934 | Olson | 408/81 |
| 2,065,486 | 12/1936 | Albertson | 408/82 |
| 2,247,283 | 6/1941 | Young | 82/1.2 |
| 2,749,788 | 6/1956 | McMahon et al. | 82/4 R |
| 2,811,903 | 11/1957 | Harmes | 82/4 R |
| 3,141,365 | 7/1964 | Peters | 82/4 R |
| 3,153,354 | 10/1964 | Prince | 82/1.2 |
| 3,331,266 | 7/1967 | Brooks | 408/80 |
| 3,350,964 | 11/1967 | Brooks | 82/4 R |
| 3,362,447 | 1/1968 | Elder | 408/109 |
| 3,717,056 | 2/1973 | Gracin et al. | 82/4 C |
| 4,236,428 | 12/1980 | Feamster | 82/4 C |

FOREIGN PATENT DOCUMENTS 414502 8/1934 United Kingdom .

Primary Examiner—Leonidas Vlachos
Assistant Examiner—Jerry Kearns
Attorney, Agent, or Firm—Fetherstonhaugh & Co.

[57] ABSTRACT

A tool for machining or repairing a worn counterbore in the cylinder block is provided with a feed control device. The refacing tool has a base structure which is attachable to the engine block. A shaft is rotatably and slidably mounted in the base structure in alignment with the counterbore and the shaft is operable by hand or by a power mechanism. Secured to the lower end of the shaft is a cutter head carrying a cutting tool mounted in a position to engage adjoining faces of the counterbore. The feed control device has an internally threaded tubular body secured to the base structure and a feed screw is threaded into the body to extend alongside the shaft. A feed plate is secured to the shaft to engage the top of the feed screw so that downward movement of the shaft is limited by corresponding movement of the feed screw. Between the feed plate and the feed screw there is a drive mechanism which rotates the screw as the shaft is rotated. The arrangement allows both faces of the counterbore to be machined with the cutting tool being controlled as it is advanced to its work by the feed control device.

8 Claims, 9 Drawing Figures

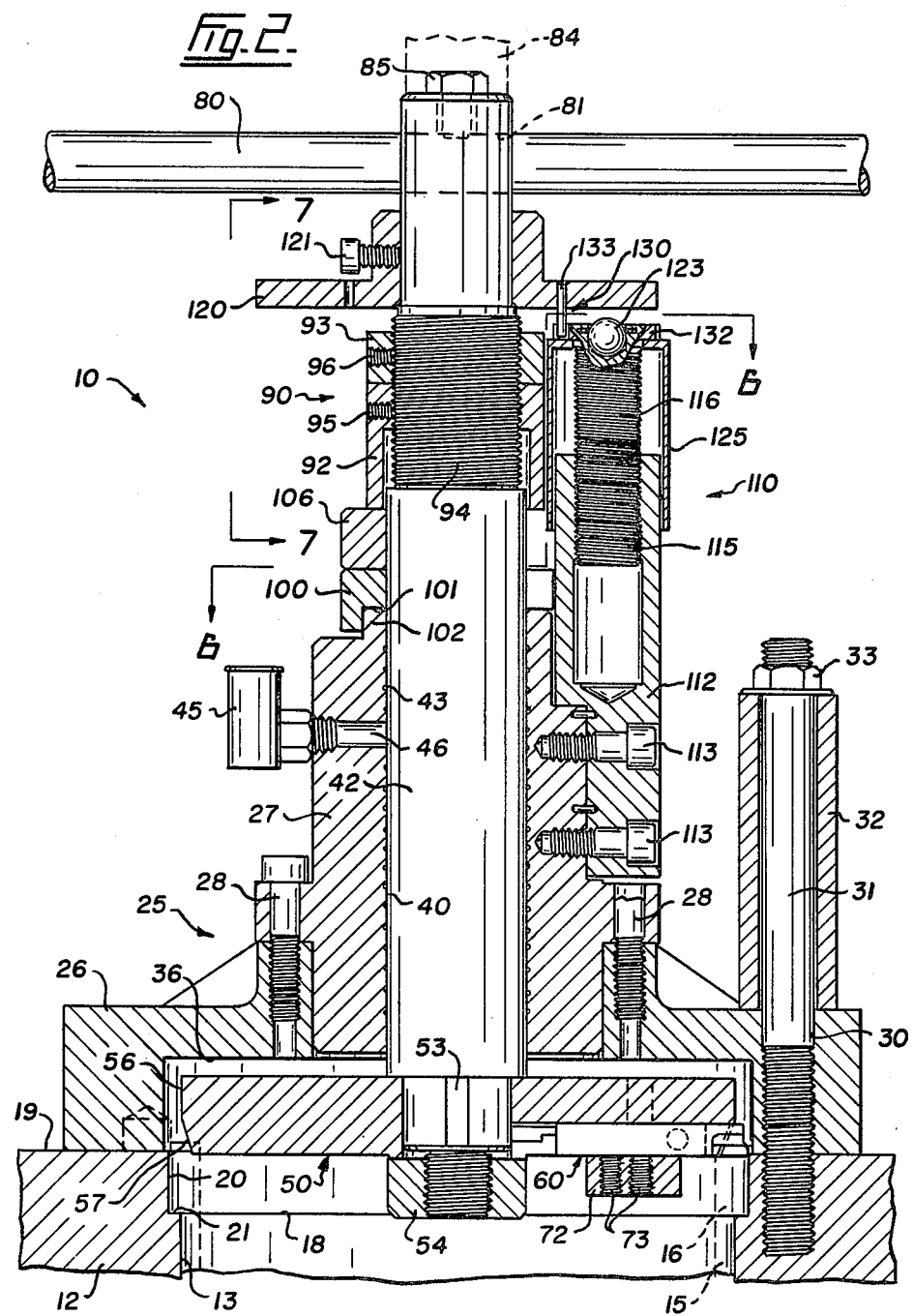

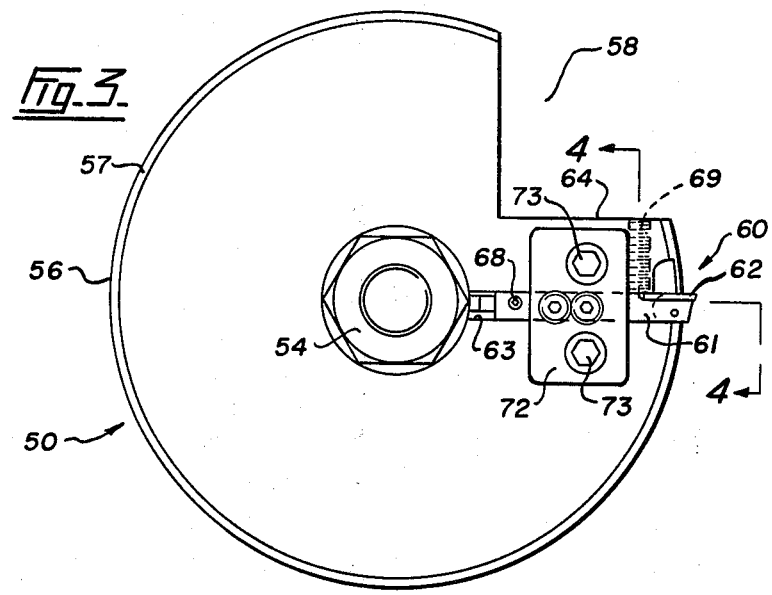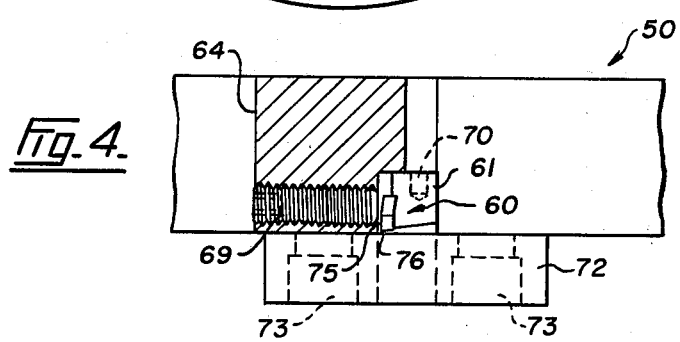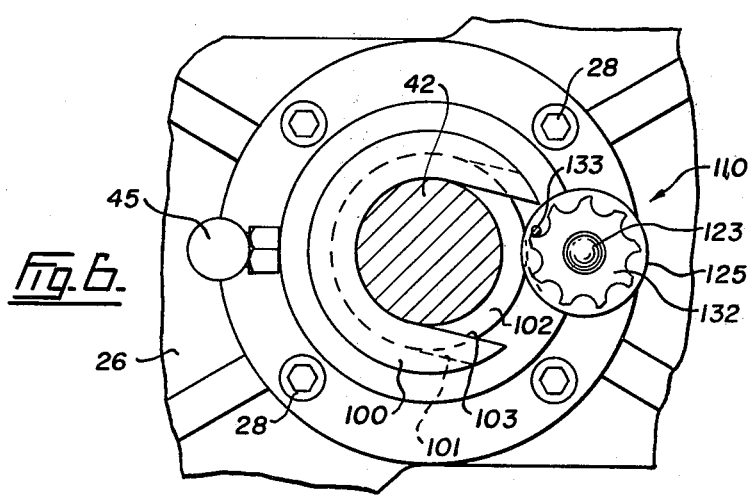

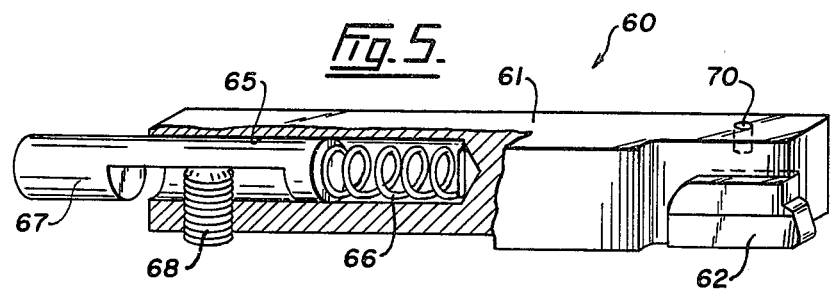
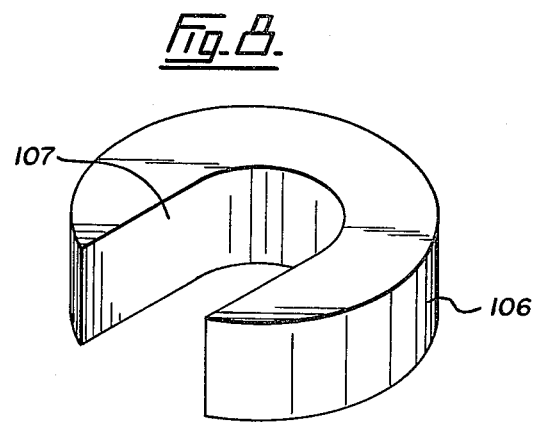
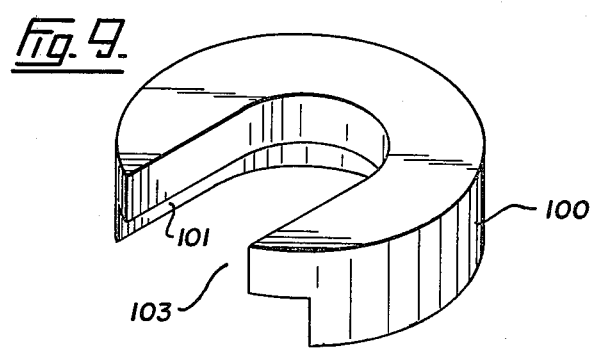

COUNTERBORE BORING AND REFACING TOOL

BACKGROUND OF THE INVENTION

The present invention relates to a tool which is particularly intended for use in refacing the counterbores formed in the cylinders of diesel engines.

The cylinders of most diesel engines are fitted with sleeves in which the pistons reciprocate and these sleeves eventually become worn and must be replaced. On the upper end of such sleeves there is an annular flange which seats in a counterbore of the cylinder. The counterbore extends from the cylinder wall to the top surface of the engine block and therefore it has a radial face parallel to that surface and a side face perpendicular to the top surface of the block. When a worn sleeve is replaced, it is common practice to reface the counterbore so that the replacement sleeve can be properly fitted into the cylinder and the annular flange will seat properly in the counterbore. This machining of the counterbore, or refacing as it is generally called, obviously is required to be done with precision since the replacement sleeve is not tightly held or correctly seated when too much metal is removed. There are tools presently available for this refacing task and usually two such tools are used, one to machine the side face of the counterbore and another to refinish the axial face of the counterbore. Such tools are costly and it has been found that a great deal of time and care must be taken in their operation if the necessary accuracy is to be achieved.

SUMMARY OF THE INVENTION

The present counterbore refacing tool provides a device which can be quickly and easily attached to an engine block in the correctly aligned position required to perform a precision machining operation. A cutting tool of the device machines two adjoining faces of the counterbore disposed at right angles to one another. The cutting speed is controlled automatically so there is no likelihood of too much metal being removed or of an uneven cut being made.

BRIEF DESCRIPTION OF THE DRAWINGS

FIG. 2 is a vertical section taken on the line 2—2 of FIG. 1, FIG. 3 is a plan view of the underside of a cutter head of the refacing tool;

FIG. 4 is an enlarged part section, part elevation, taken on the line 4—4 of FIG. 3 and showing a cutting tool of the refacing tool, FIG. 5 is a perspective view, part in section, showing the cutting tool as held by the cutter head, FIG. 6 is a horizontal section taken on the line 6—6 of FIG. 2 and showing drive-transmitting means of the refacing tool, FIG. 8 is a perspective view of a depth gauge of the refacing tool, and FIG. 9 is a perspective view of a centering spacer of the refacing tool.

DESCRIPTION OF THE PREFERRED EMBODIMENTS

Figure 1:
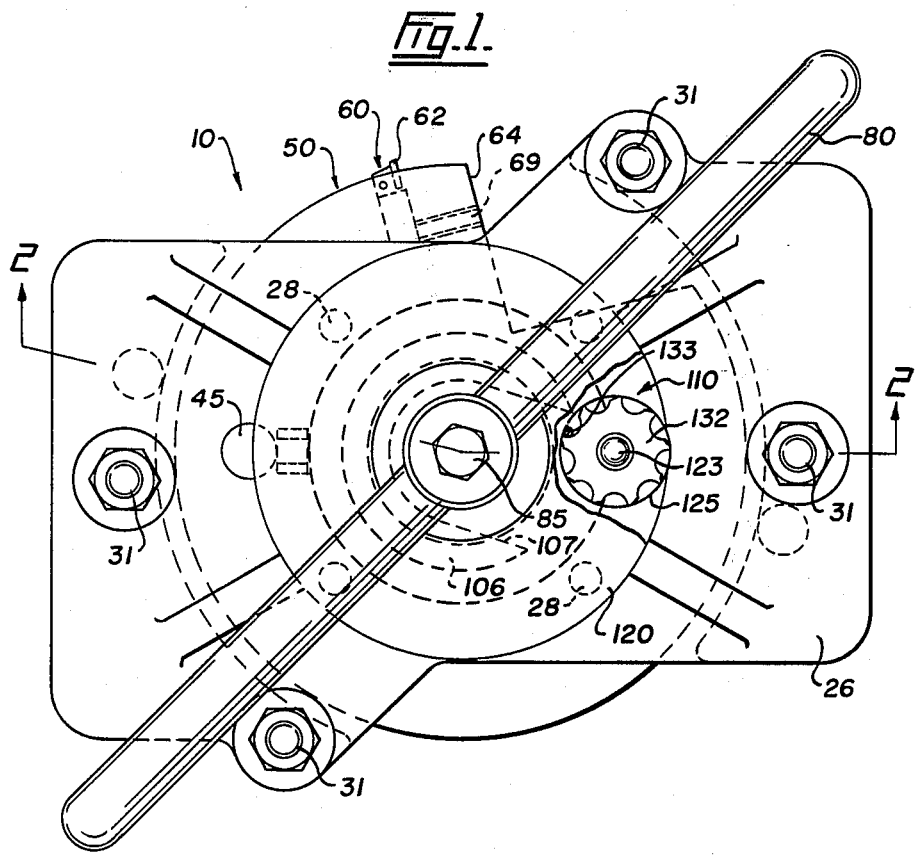
FIG. 1 is a plan view of a counterbore boring and refacing tool constructed in accordance with the present invention.

Referring to the drawings, the numeral 10 indicates generally a counterbore boring and refacing tool constructed in accordance with the present invention. The tool 10 is capable of performing a number of counterbore forming and refinishing jobs but it is particularly intended to be employed during the overhaul of a widely-used diesel engine which has a block 12 in which cylinder bores 13 are formed, see FIG. 2. The cylinders of this type of diesel are each fitted with a sleeve liner 15 which is indicated by dotted lines in FIG. 2. The liner has a laterally-projecting flange 16 at the upper end, the flange seating in a counterbore 18 machined into a top surface 19 of the engine block above the cylinder bore. After a known period of engine operation, the counterbore usually will be found to be unevenly worn to the extent that the side face 20 of the counterbore is not truly concentric to the bore of the cylinder. This makes it necessary to machine the face 20 and fit the cylinder with a new liner having an oversize flange 16. The usual practice is to refinish the radial face 21 of the counterbore when the machining is being done and the present tool can perform this secondary task as well.

The features and advantages of the tool 10 will be appreciated best when the operation of the device is later explained but, in the drawings, the tool 10 is shown to comprise a hub-like structure 25 which is adapted to be mounted on the engine block to perform the refacing operation. This mounting hub 25 comprises a base plate 26 and a heavy sleeve 27 which are secured together by means of bolts 28, see particularly FIG. 2. FIG. 1 shows the plate 26 to be of an irregular rectangular shape when viewed in plan and it should be noted that this is the shape of the head (not shown) normally bolted to the engine block to cover each cylinder of the diesel engine which is machined by the present tool. Suitably spaced holes 30 are provided in the base plate, these holes being arranged to register with the studs 31 normally used to clamp the engine head to the top surface 19 of the engine block. The head studs 31 project upwardly through the holes in the base plate and are each fitted with a spacer tube 32 and a nut 33. By tightening the nuts 33, the mounting hub 25 is firmly clamped to the top surface 19 of the engine block. At this time, a cylindrical recess 36 formed on the underside of the base plate 26 is concentric with the cylinder bore 13.

The sleeve 27 of the mounting hub provides an elongated bearing 40 for a shaft 42. Preferably, the surface of this bearing is provided with a helical oil groove 43. A supply of lubricating oil is contained in a reservoir cup 45 which is threaded into a lateral passageway 46 formed in the sleeve to connect with the helical groove. Thus, the shaft 42 is supported to rotate freely in a vertically elongated bearing 40 and to slide up and down with the longitudinal axis of the shaft being aligned with the corresponding axis of the cylinder bore.

The lower end of the shaft 42 is fitted with a cutter head 50. This substantially disc-like cutter head is secured against rotation on the shaft by a key 53 and is clamped to the shaft by a nut 54, see FIGS. 2 and 3. The cutter head has a side edge 56 which is perpendicular to the top face of the head and a bevelled edge 57 which slopes inwardly towards the bottom face of the head. In FIG. 3, the cutter head will be seen to have a portion removed to provide a cut-out 58.

The cutter head 50 serves to support a cutting tool which is generally indicated at 60. As shown best in FIG. 5, the tool 60 comprises an oblong bar 61 which is fitted at one end with a bit 62. A radial groove 63 (FIG. 3) is formed on the underside (FIG. 3) of the head near a side edge 64 of the cut-out 58 to receive the tool 60. A longitudinal recess 65, see FIG. 5, extends into the inner end of the rear 61 to house a spring 66 and an extensible spacer rod 67. The slidably-supported spacer rod is urged out of the recess by the spring and a grub screw 68 is fitted to the lower face of the bar to hold the rod 67 in a selected position. Another locking screw 69 on the head, see particularly FIG. 4, extends inwardly from the side face 64 of the cut-out to hold the bar and bit in an adjusted position within the groove 63. The locking screw 69 engages a side face of the bar 61 near a hole 70 formed in the top face of the cutter bar. The bar 61 is held against dislodgement from the groove 63 by a clamping block 72 which is secured to the underside of the head by means of set screws 73.

The foregoing arrangement allows the cutting tool 60 to be adjusted so that the bit projects a suitable distance beyond the side edge 56 of the head. The bit 61 which is secured to the outwardly-projecting end of the bar is shown best in FIG. 4 to have two cutting edges 75 and 76 with appropriate clearance faces nearby. It will be noticed that the cutting edge 75 is substantially vertically disposed so as to engage the axial face 21 of the counterbore. The edge 76 is horizontally disposed to engage the radial face 21 of the counterbore.

As shown in FIGS. 1 and 2, one means of rotating the shaft 42 is by use of the handle 80 which extends through an opening 81 formed in the upper end of the shaft. This handle, of course, also enables the shaft to be raised and lowered in the sleeve bearing 40 as is required to move the cutter head 50 into and out of the cylindrical recess 36.

A preferred means of rotating the shaft 42 is by using a power tool such as a readily-available electric drill (not shown) which is fitted with a drive socket 84 as indicated by dotted lines in FIG. 2. The upper end of the shaft is fitted with a nut 85 for engagement by the drive socket. In the case of an electric drill, a suitable reduction is provided to reduce the speed of rotation of the shaft to between 100 and 160 rpm.

Figure 7:
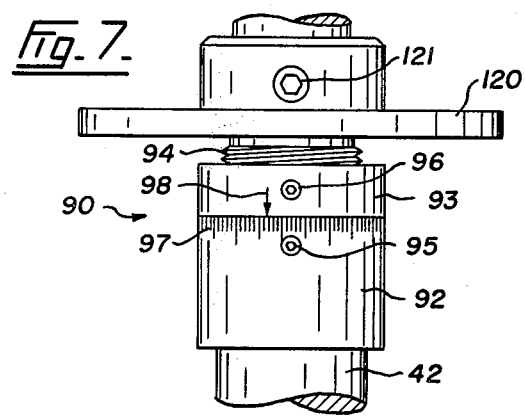
FIG. 7 is a side elevation of a depth control means of the refacing tool.

The counterbore refacing tool 10 is provided with means generally indicated at 90 for selectively controlling axial movement of the shaft 42 whereby to limit the distance the cutting tool is advanced into the counterbore. Referring now to FIGS. 2 and 6, the depth control means 90 is shown to comprise adjusting nuts 92 and 93 which are fitted to a threaded upper portion 94 of the shaft 42. The large nut 92 is adapted to be secured against rotation by means of a locking screw 95. A similar screw 96 serves to secure the relatively small depth-limiting nut 93 in a selected position on the shaft. In FIG. 7, it will be seen that around the entire circumference of the large lock nut there are an appropriate number of circumferentially-arranged graduations 97 each representing one thousandths of an inch (0.001). The nut 93 has two diametrically-opposed index marks 98 (one only shown in FIG. 7) against which the graduations 97 can be read.

The depth control means 90 also includes a centering spacer 100 which is shown in FIGS. 2, 6 and 9. On the lower surface of this horseshoe-like spacer there is provided a recess 101 which allows the spacer to fit snugly over a cylindrical neck 102 formed on the upper end of the sleeve 27. A portion of the spacer is cut away as shown best in FIGS. 6 and 9 to provide a side slot 103 allowing the spacer to be slipped around the shaft 42 when it is fitted to the neck of the sleeve as will be explained later.

The means 90 also includes a depth gauge 106, see FIGS. 2 and 8. As shown best in FIG. 8, the gauge 106 is a precision machined disc of metal which has a side slot 107 shaped to allow the gauge to be slipped around the shaft over the centering spacer 100. The thickness of the depth gauge 106 is known and is related to the depth of cut which must be made by the present tool for the particular engine being machined as will be explained later.

The tool 10 is provided with another control device generally indicated at 110, which device operates to control the rate of feed of the tool. The device 110 comprises a body 112 which is bolted to the sleeve 27 as at 113. An upper portion of the body extends alongside the threaded portion 94 of the shaft and this body portion has internally threaded bore 115. A feed screw 116 is threaded into the bore normally to project above the top of the body 112. The feed screw 116, of course, is supported by the body to extend parallel to the longitudinal axis of the shaft 42 and the threads of the bore and screw are very fine and of a known pitch.

The shaft 42 is fitted with a feed plate 120 which is held in position by a clamping bolt 121, the feed plate extending over the feed screw 116. A ball bearing 123 is mounted on top of the feed screw to bear against the underside of the plate 120. The ball bearing is rotatably supported by the feed screw and is suitably held against displacement partly by means of a shroud 125. The knurled shroud is secured to the feed screw 116 to rotate therewith and extends downwardly over the upper portion of the body 112 so as to protect the fine threads of the screw and the bore from dirt or damage which might interfere with the operation of these two members.

When the feed plate 120 is rotated with the shaft, drive is transmitted to the feed screw 116 by means generally indicated at 130. The drive-transmitting means 130 comprises a socket 132 which is suitably secured to the top of the feed screw 116. A pin 133 depends from the underside of the feed plate to engage the teeth of the sprocket when the shaft is rotated. Each time the plate 120 is rotated 360°, the drive pin 133 meshes once with the driven sprocket 132 and rotates the feed screw 116 as well as the shroud a partial turn so that the continually rotating shaft 42 drives the feed screw intermittently. The drive-transmitting means 130, of course, is selected to give a predetermined rate of feed suitable for this particular machining operation. If necessary the rate of feed can be varied by changing the pitch of the threads on the screw 116 and bore 115 or by adding extra drive pins to the plate 120.

The tool 10 is used during the general overhaul of a diesel engine in a machine shop or elsewhere but it has also been found extremely useful when a mechanic is required to work on an engine at a remote construction site for example or when doing field work generally. The head of any cylinder needing relining is removed and the worn liner is extracted. Tool 10 is prepared for use by backing off the adjusting nuts 93 and 92 to their uppermost positions. The centering spacer 100 is removed (normally the gauge 106 is not on the tool at this time) and so is the cutting tool 60. Removal of the tool 60 is accomplished by loosening the locking screw 69 and inserting a suitable hook-like tool (not shown) into the hole 70 so that the cutting tool assembly can be pulled radially outwards.

The tool 10 is placed on the engine block in the location formally occupied by the head which was removed. Assuming only one cylinder counterbore requires machining, it is not necessary to remove adjacent heads since the base plate 26 fits between those heads and provides access to the perimeter of the cutter head 50 as shown in FIG. 1. The head studs 31 are lowered through the openings 30 and are screwed into their threaded openings in the engine block. With the spacer tubes 32 in place over the head studs, the nuts 33 are added to the studs but are not tightened at this time. This procedure roughly aligns the recess 36 with the cylinder bore 13. Now the shaft 42 is lowered until the beveled edge 57 of the cutter head rests on the inner edge or corner formed by the radial edge 21 of the counterbore and the cylinder bore 13. The base plate 26 is then wiggled slightly and, because of the engagement of the edge 57 with the corner of the radial edge of the counterbore, the tool 10 is properly seated with axes of the shaft and cylinder being exactly aligned. The nuts 33 are now carefully tightened to secure the tool in the required position to perform the counterbore refacing operation.

The bar 61 and bit 62 are adjusted as to overall length by means of a micrometer according to the amount of metal which should be removed from the side face 20 of the counterbore of the particular engine being worked upon. The tool operator consults a set of tables and finds that the required adjustment which is set by loosening the set screw 68 and extending the spacer rod 67 as required. By use of the micrometer, the mechanic sets the overall length of the cutting tool 60 as indicated by his tables. The overall length, of course, is from the innermost end of the spacer rod 67 to the tip of the bit 63. The grub screw 68 is tightened when this adjustment is made and the tool 60 is replaced in the groove 63. To do this, the shaft 42 is again fully raised and is turned to place the open end of the groove 63 in the space provided by the shape of the base plate 26 or as shown in FIG. 1. The tool 60 is inserted into the groove but is not pushed in as far as it will go but rather is held by the screw 69 so that the bit 63 protrudes about ¼ of an inch beyond the side face 20 of the counterbore. At this point, the shaft 42 is lowered until the bit 63 rests on the top surface 19 of the engine block.

The centering spacer 100 is placed on top of the sleeve 27 so as to embrace the shaft and a depth gauge 106 is selected for placement on top of the spacer. This selection of a depth gauge is determined by the distance between the block surface 19 and the radial face 21 plus the amount of metal which is considered desirable to remove from the radial face. Once a depth gauge having a thickness equal to this overall depth is placed in position, the large adjusting nut 93 is advanced down the shaft into contact with the top surface of the depth gauge. The shaft and cutter head are supported against vertical movement at this time by virtue of the bit 63 resting on the engine block and the small adjusting nut 93 is advanced into contact with the nut 92 whereupon the locking screw 96 is tightened to prevent further rotation of the small adjusting nut. As will be explained later, it is this set position of the small adjusting nut 93 which determines the final depth to which the cutting tool is permitted to travel.

Next, the feed screw 116 is backed off until the ball bearing 123 is in contact with the underside of the feed plate 120 and the shaft 42 is supported in a position which will raise the bit 63 just clear of the top surface 19 of the engine block. The tool 60 is pushed in as far as it will go at which time the innermost end of the spacer rod 66 is in contact with the lower end of the shaft. The tip of the bit 63 then is positioned to project the exact distance beyond the side face 20 of the counterbore to remove the required amount of metal from that face. Once the locking screw 69 is retightened, the depth gauge 106 is removed whereupon the refacing operation can commence.

The shaft 42 is rotated by hand one or two turns to ensure that the drive pin 133 is making proper engagement with the teeth of the drive sprocket 132. It is at this point that the graduations 97 on the nut 93 come into use. Those graduations, it will be recalled, each represent a depth of cut into the counterbore of 0.001. With the nut 93 still locked in place, the nut 92 is advanced a suitable distance which be set by reference to an index mark 98 at 0.003 for example. Thus, the cut into the counterbore will be halted 0.003 above the depth to which the final cut is to be made.

Next the drive socket 84 of the electric drill is fitted to the nut 85 on the shaft and the drive motor is started to drive the tool 10. As the shaft 42 and the feed plate 120 are rotated at a constant speed by the drill, the drive means 130 transmits that rotation to the feed screw 116. The pitch of the threads on the feed screw and the number of teeth on the sprocket 132 are interrelated to provide an optimum feed rate for the particular machining conditions. The bit 63 removes metal from the face 20 of the exact radial depth selected by the micrometer adjustment of the overall length of the cutting tool 60. Cutting is brought to a halt when the nut 93 moves down to engage the nut 92 but the operator then advances the nut 92 another 0.003 or 0.004 so that the cutting can be carried out precisely in easy stages. It will be noted the feed rate is unaffected by ambient temperature and the feed is positive, that is, the cutter descends a definite and constant amount per revolution and removes metal cleanly and without chatter from the side face 20 of the counterbore.

When the large adjusting nut 92 comes into contact with the spacer 100, the bit 63 ceases to cut and this indicates to the tool operator that he is within 0.003 of the final depth of cut. The motor of the electric drill is stopped at this point and the drill is removed from the shaft. The handle 80 is then fitted to the shaft to allow the remaining 0.003 of cut to be done by hand. The shaft 42 is rotated relatively slowly using the handle and the nut 92 is backed of 0.001 to 0.002 at a time as the final hand cutting is done finish the side face 20 and remove the required axial depth of metal from the radial face 21. When the nut 92 has been backed off to a point where it is held against further rotation by the nut 93, then the cut has been completed. It will be found there are no chatter marks on the faces 20 and 21 when cutting is done in this manner. Only the required amount of metal has been removed from both faces of the counterbore, that is, the amount set by adjustment of the length of the cutting tool 60 and the setting of the nut 93 on the shaft. The nut 92 is adjusted or moved between the nut 93 and the spacer 100 to allow the cutting to be done in stages, with precision and without marring the faces of the counterbore which might interfere with the proper seating and press fit required by the sleeve liner 15.

The operation described above serves to enlarge the counterbore 18 to take the oversize sleeve liner 15 and both the radial and side faces, of course, are machined by the various adjustments of the tool 10. Assuming other cylinders of the same engine need to have their counterbores machined, it is not necessary to readjust the tool for each operation. The transfer is done by removing the cutting tool 60, shifting the tool 10 to the next cylinder, and removing the centering spacer 100 from the shaft. This allows the cutter head 50 to enter the counterbore so that the edge 58 of the cutter head can be seated and the tool can be properly centered as previously described before the nuts 33 are tightened on the head studs. Once the tool 60 and the spacer 100 are replaced, on the shaft 42, cutting can commence since there is no need to readjust the nut 92. By leaving the nut 92 in its previously adjusted position on the shaft, the tool 10 is back to the same setting as for the first cylinder and the cut now being made will be exactly as the original cut.

From the foregoing, it will be apparent the present invention provides a fairly simply constructed and easily operated tool for refinishing cylinder counterbores. The depth control means 90 allows the cutting to be done precisely to the preselected depth. Additionally, the rate of feed is controlled by the feed screw 116 and associated parts in a positive way with cutting tool being advanced a definite and constant distance for each revolution of the shaft. The centering spacer 100 and the depth gauge 106 are both removable from the shaft to allow entry of the cutter head into the counterbore and a shoft distance into the cylinder bore as well. This penetration allows the bevelled edge 57 to be used as a means for centering the present tool. The removable gauge 106 for a particular engine eliminates the need to adjust the tool 10 using a micrometer and inside calipers as might otherwise be the case.

What is claimed is:

1. A tool for removing material from a cylindrical opening in a workpiece, said tool comprising a mounting hub adapted to be secured to the workpiece over the cylindrical opening, a shaft rotatably and axially movable in the mounting hub with the longitudinal axis of said shaft aligned with the corresponding axis of the cylindrical opening, a cutter head secured to the shaft for rotation within the cylindrical opening and including a cutting tool mounted in a position to engage a face of the cylindrical opening, means for rotating and advancing the shaft to operate the cutting tool, a first threaded feed member on the mounting hub alongside an upper portion of the shaft, a second threaded feed member threadedly engaging the first threaded feed member, a feed plate mounted on the upper portion of the shaft to rotate with said shaft while in operative engagement with the second threaded feed member, means for rotating the shaft, and drive-transmitting means operatively connecting the feed plate to the second threaded feed member whereby rotation of the shaft to operate the cutting tool results in rotation and advancement of the second threaded feed member allowing axial movement of the shaft at a rate of feed commenserate with the speed of rotation of the shaft, depth control means between the shaft and the mounting hub for selectively controlling axial movement of said shaft whereby to limit the distance the cutting tool is moved into the cylindrical opening, said depth control means comprising first and second adjusting nuts threadedly secured to the shaft above the mounting hub, and a slotted centering spacer removably mounted on the shaft between the first adjusting nut and the mounting hub.

2. A tool as claimed in claim 1, and including a thrust bearing mounted on the second threaded feed member in a position to be rotatably engaged by the feed plate.

3. A tool for refacing a counterbore of a cylinder formed in an engine block and comprising a mounting hub securable to the engine block, a shaft rotatably and axially movable in the mounting hub with the longitudinal axis of said shaft aligned with the corresponding axis of the counterbore, a cutter head secured to the shaft for rotation within the counterbore and including a cutting tool, means for rotating the shaft to apply the cutting tool to the counterbore, an internally threaded body fixedly secured to the mounting hub alongside the shaft, a feed screw threaded into the body, a feed plate mounted on the shaft for rotation therewith, a thrust bearing on the feed screw engagable by the feed plate, a driven sprocket nonrotatably secured to the feed screw, and a drive pin carried by the feed plate to engage the driven sprocket whereby rotation of the shaft to operate the cutting tool results in advancement of the feed screw allowing axial movement of the shaft and cutting action of the cutting tool at a rate of feed commenserate with the speed of rotation of the shaft.

4. A tool as claimed in claim 3, in which said cutting tool has a first cutting edge for initially engaging a side face of the counterbore and a second cutting edge for subsequently engaging a radial face of the counterbore.

5. A tool as claimed in claim 4, in which said cutting tool comprises a bar having a bit and an extensible spacer rod on opposite ends thereof, one end of the extensible spacer rod having sliding engagement with the shaft when the first cutting edge is in cutting engagement with the side face of the counterbore, and means on the bar for locking the extensible spacer rod in a selected extended position.

6. A tool as claimed in claim 5, in which said cutter head has a bevelled edge adapted to engage a portion of the counterbore to align the longitudinal axis of the shaft with the corresponding axis of the cylinder.

7. A tool as claimed in claim 1, and including a depth gauge of a predetermined thickness removably mounted on the shaft and being enterable between the first adjusting nut and the centering spacer.

8. A tool as claimed in claim 7, in which said first adjusting nut has circumferentially arranged graduations representing depth of cut, and said second adjusting nut having an index mark for the graduations.

* * * * *